UNITED STATES PATENT OFFICE.

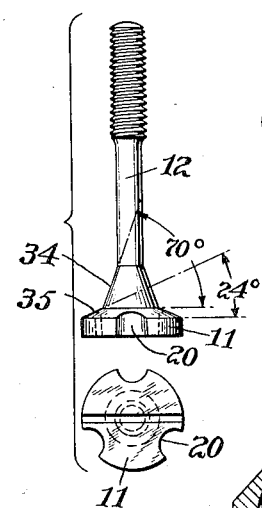
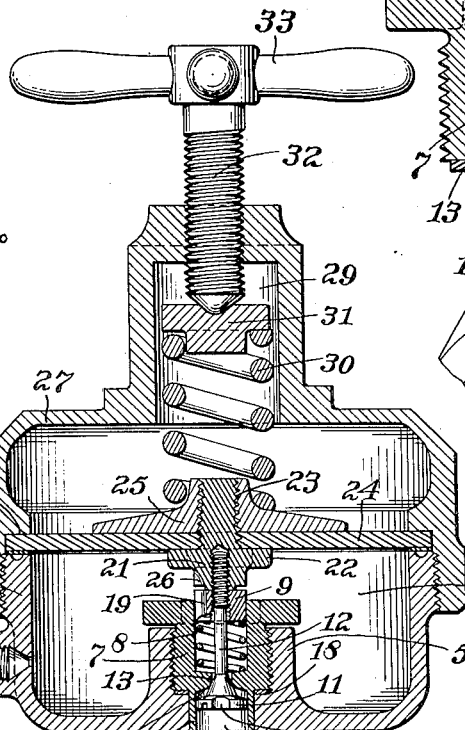
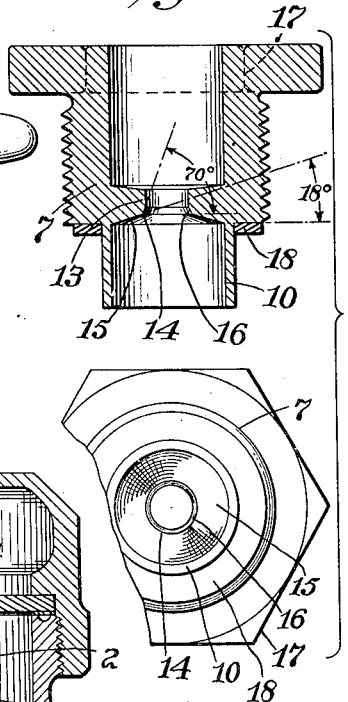
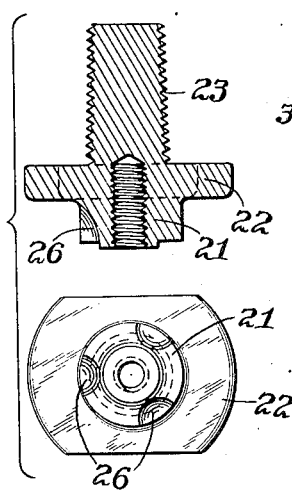
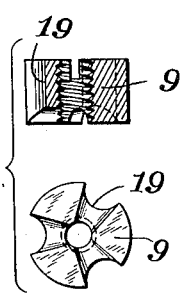
Oct. 19, 1926.  
T. COLES  
1,603,747  
VALVE AND SEAT FOR PRESSURE REGULATORS AND METHOD OF MAKING THE SAME  
Filed Feb. 16, 1926
Inventor:  
Thomas Coles, Patented Oct. 19, 1926.                                    1,603,747

THOMAS COLES, OF HOMESTEAD, PENNSYLVANIA.

VALVE AND SEAT FOR PRESSURE REGULATORS AND METHOD OF MAKING THE SAME.

Application filed February 16, 1926. Serial No. 88,569.

My present invention relates to a reducing valve such as is used with high pressure gas containers designed to regulate pressure and control the volume of gases or fluids used to feed the combustion flame of a blow pipe or torch employed in the cutting or welding of metals.

While the invention is particularly applicable to the above use, yet obviously it may be used with any style of regulator as applied to high pressure gas containers for regulating the flow therefrom.

The particular objects of the invention are to provide a reducing valve which will maintain true alignment of the valve stem with the valve seat, to obtain accurate seating of the valve, to provide a construction which will prevent fracturing, spawling or crushing of the valve stem and of the valve seat, to prevent leaking or creeping through fractures or defects in the valve members of surplus volume and excess pressures of the gases under use, and to prevent dangerous explosions in the regulator arising from possible sparks being generated through friction of the gas under high pressure in passing over, through or along the valve members in the regulator when the regulator is used with combustible gases, such as oxygen.

Further objects and advantages will be developed as the description proceeds and with reference to the accompanying drawings.

In the drawings I have illustrated a preferred form of my invention, although obviously I do not wish to be limited specifically thereto.

In the drawings:

Fig. 1 is a sectional elevation of a regulator constructed according to my invention.

Fig. 2 is a composite view of the vlave.

Fig. 3 is a composite view of the valve seat.

Fig. 4 is a similar view of the diaphragm nut.

Fig. 5 is a like view of the guide nut.

Referring now with particularity to the embodiment illustrated, I have shown the main body 1 having an upper space or chamber 2 where the gas is accumulated and maintained under a constant predetermined reduced working pressure, and a smaller lower space or chamber 3 which receives and holds the high pressure gas flowing from the ordinary gas cylinder or container.

The body 1 has at its base a lower hub 4 which extends upwardly to form an upper hub 5 within the upper chamber 2. The hubs are axially cored and internally threaded to receive other parts of the regulator, as will be more fully described hereinafter. It is to be noted that the lower chamber 3 is formed in the axial bore of the hub parts.

The body 1 is provided with an outlet 6 through which the low working pressure gas flows to the blow torch or other device.

A valve seat bushing 7 externally threaded to screw into the upper hub 5 is axially bored to freely receive the helical valve spring 8 and the guide nut 9. The lower portion of the valve seat bushing 7 is provided with a lower extension constituting a guide sleeve 10 which freely receives the head 11 of the valve stem 12 and acts as a guide therefor. Above the downwardly extending guide sleeve 10 is a ledge or shoulder 13 upon which the helical valve spring 8 rests. The under side of the shoulder 13 constitutes a valve seat 14 constituting faces 15 and 16. The axial bore of the valve seat bushing 7 provides a free passageway for the valve stem 12.

The bushing 7 is flanged at its top in preferably a hexagonal manner, as indicated at 17, so as to permit the same to be engaged by a wrench in case it is desired to tighten up or remove the bushing. A fiber gasket 18 rests upon that part of the bushing 7 surrounding the upper part of the extension guide sleeve 10 and serves to make a tight joint.

The guide nut 9 is axially bored and internally threaded to receive the externally threaded top end of the valve stem 12, said nut 9 extending into the axial aperture in the valve seat bushing 7 and acting as a guide for the valve stem 12. The lower portion of the guide nut 9 engages with required tension the helical valve spring 8 and this tension may be increased or decreased by a proper rotation of the nut 9. The nut 9 is fluted on its periphery as at 19 to permit free flow of gas therethrough from the aperture in the valve seat bushing 7 to the upper chamber 2.

The valve stem head 11 is likewise fluted as at 20 on its outer periphery to permit the free flow of gas therethrough from the lower chamber 3 into the upper chamber 2.

A diaphragm nut 21 having a flange 22 thereon having an irregular periphery so as to be engaged by the jaws of a wrench is provided, the upper end of which is externally threaded as at 23 to screw into a threaded hole in the center of a diaphragm 24 and thence into a similarly threaded aperture in the center of the diaphragm plate 25. The lower portion of the nut 21 is of a diameter equal to or slightly less than the diameter of the guide nut 9 and is fluted as at 26 to correspond with the channels 19 in the nut 9. The diaphragm nut 21 is likewise provided with a screw threaded axial aperture adapted to receive the threaded top of the valve stem 12 and to engage the top of the guide nut 9 with the jam nut effect.

The diaphragm 24 may be of any satisfactory material, such as a high grade of diaphragm rubber, although preferably I make this element of German silver and phosphor bronze. This diaphragm rests upon the upper circular rim of the body 1 and is secured thereto by first placing thereon a thin brass washer for the purpose of taking up the friction or twisting strain, and then screwing down the cap 27 over the rim of the body 1, whereby its shoulder 28 meets the rim of the diaphragm and is then screwed down firmly thereon.

The upper circular rim of the body 1 is of slightly greater diameter than the remainder of the body and than that of the diaphragm 24, and is externally threaded to receive the diaphragm hood or cap 27.

This cap 27 is provided with an inner shoulder 28 adapted to rest upon the outer rim of the diaphragm 24, and is also provided with an upper chamber 29 of sufficient inner diameter to freely receive the main compression spring 30.

The compression spring 30 rests upon the diaphragm plate 25 and supports at its upper end a button 31 partially extending within the spring and which has a depressed upper portion adapted to receive the pointed lower end of the compression key 32 which may be provided with a wheel 33 or other convenient member for rotating the same.

The valve head 12 comprises two frusto-conical portions forming faces 34 and 35, the face 34 making an angle of approximately 70° with a horizontal line through its base and the face 35 making an angle of approximately 24° with a horizontal line passing through its base. It is to be noted that the faces 15 and 16 of the valve seat likewise form in effect two frusto-conical surfaces, the face 16 making an angle of approximately 70° with a horizontal line passing through its base, which is approximately the same as the face 34 of the stem with which it engages, while the face 15 of the valve stem makes approximately an angle of 18° with a horizontal line passing through its base, or an angle slightly less than the angle of the face 35 on the valve head with which it engages.

A coupling nut 36 internally threaded and having a shoulder 37 at its upper portion is adapted to be engaged by a shoulder 38 on a coupling nipple 39, the upper end of the nipple being threaded into the lower hub 4 of the body 1. A coupling nut 36 is adapted to be secured to the outlet from the pressure container and the gas finds its way through an axial aperture 40 in the nipple 39 to the regulator proper.

It will be noted from the use of this construction that the valve stem and head with its faces are held and maintained in true alignment within the valve seat bushing 7 and in relation to the corresponding faces of the valve seat: first, by reason of the fact that the upper end of the valve stem 11 is screwed through the center of the guide nut 9, which nut acts closely but freely within the upper portion of the axial aperture within the valve seat bushing 7; second, by reason of the fact that the valve head acts closely but freely within the guide sleeve 10 so that any irregular resiliency or contortion of the diaphragm 24 cannot throw the valve stem off center or cause imperfect seating of the regulator valve. This tends to maintain the flow of gas constant both in volume and in pressure.

The area of the face 16 on the valve seat being small and limited with its large angle as a relatively small bearing surface in contact with the corresponding face 34 of the valve head, the fact that the face 16 of the valve seat is of relatively small area and acting upon a correspondingly angled seat of much larger area, assures these two faces in making contact, even though the valve head or the valve seat are subjected to wear.

The acute angled faces 35 and 15 on the head and seat respectively insure constant uniform and positive reseating, even when the valve is subjected to wear, and thereby prevent fracturing and spawling of the valve members.

The fact that the valve head closes in the direction of flow of the high pressure gas and that the area of the bottom of the valve head is much greater than the actual seating surface of the valve, causes a constant tendency to reseat itself and thereby prevents the risk of explosions through the creeping up of gas pressure on the low pressure side of the gas regulator.

I have found that it is extremely desirable to make both valve head and seat of a material which will neither fracture, crack or spawl under the tremendous pressures usually obtaining, which will not allow foreign substances in the gas to adhere, which will not be of a porous nature, which will not allow the gas under requisite high pressure to leak or blow therethrough, and yet which will not spark or strike fire by reason of the friction caused by the high pressure gas, such as oxygen, which would result in disastrous explosion.

As the most efficient work in welding or cutting metals by means of, for instance, an oxyacetylene flame, is done where the gas is maintained on the low pressure side at pressures say from 200 to 250 pounds per square inch, it is absolutely essential that a valve head and seat be provided which will not allow this tremendous pressure to leak and which will not have the defects above noted.

I have found that a valve stem head as used in such regulators may advantageously be made of an alloy which will possess relatively non-sparking and substantially fibrous properties, and a tensile strength of at least 85,000 pounds per square inch, to consist preferably of an alloy comprising approximately 72% nickel, 1.5% iron and 26.5% copper, rolled, forged at at least 1550° F., then immediately air cooled by the use of a cold air current to produce the sufficiently annealed quality which imparts to the alloy the required fibrous property. I have found that a suitable valve seat for use in combination with the above described valve stem and head may consist of a non-sparking, non-corrosive, high density alloy having a tensile strength of at least 260,000 pounds per square inch, and comprising preferably approximately 75% copper and 25% zinc, alloyed and treated in a bath of molten hard solder in order to increase its density, so as to prevent gases at pressures of 1,800 pounds or more per square inch from creeping through the material thereof. Such hard solder may comprise two parts tin and one part lead with a melting point of about 260°, which proportions may be increased up to one part tin and three parts lead with a melting point of about 500°.

While I have given the preferred composition of the alloy used for the valve head and valve seat, I have found that any proportions between the preferred example and one consisting of 66.59% nickel, 2.69% iron and 30.24% copper may be used. The alloy comprising the last proportions has approximately the same tensile strength as the preferred embodiment, but has increased ductility, which is not desirable. By changing the proportions in the same relation on the other side of the preferred example, an alloy is produced with increased elasticity but approaches a brittle or crystalline structure, which is not desirable.

However, as it is extremely important that tensile strength, non-corrosive and non-firing properties be maintained, the question of elasticity or ductility matters little, as long as it does not go too far up or down.

As to the seat composition, it is not necessary to hold exactly to the proportions above given, but as the proportion of zinc is increased the malleability is decreased and brittleness and coarseness of structure is produced, which is not desirable. Similarly, the addition of tin or lead to the mixture impairs the tenacity of the metal.

The operation of the device is as follows:

The coupling nut 36 having been attached to the pressure container from which the supply of gas is to be taken and the gas turned on, at this point it will be apparent that the valve head 11 will seat if the pressure of the main compression spring 30 is less than the pressure of the gas and therefore there will be no flow of gas from the exit or outlet 6. In order to produce a flow of gas through the outlet, it now only becomes necessary to compress the spring 30 until the pressure of the gas in the chamber 3 has been overcome, so that the diaphragm and its attached parts, which includes the valve stem and head, will move downwardly, thus allowing the gas in the high pressure chamber 3 to escape through the valve stem opening through the guide nut 9 and out of the exit 6 to the work.

I claim:

1. In a valve of high pressure gas regulators, a valve seat member comprising an alloy consisting substantially of 75% copper and 25% zinc treated in a bath of molten hard solder in order to increase its density, possessing dense, high tensile and sparkless properties sufficient to resist fracturing and crushing of the seat member, to prevent leaking through of surplus volume and excess pressure of the gases under use.

2. In the valve of high pressure gas regulators, a valve stem and head member comprising an alloy of 72% nickel, 1.5% iron and 26.5% copper rolled, forged, and annealed to restore its required fibrous property, possessing dense, fibrous, high tensile and sparkless properties, in combined use with a valve seat member consisting substantially of 75% copper and 25% zinc treated in a bath of molten hard solder in order to increase its density, possessing dense, high tensile and sparkless properties, and sufficient in combined use to resist cracking, fracturing, crushing and spawling of the members, to prevent leaking through of surplus volume and excess pressure of the gases under use.

3. In the valve of high pressure gas regulators, a valve seat member comprising an alloy consisting substantially of 75% copper and 25% zinc treated in a bath of molten hard solder in order to increase its density, possessing substantially higher tensile strength than the material of the valve stem and head member and having dense, high tensile, and sparkless properties sufficient to resist fracturing and crushing of the seat member, to prevent leaking through of surplus volume and excess pressure of the gases under use.

4. In the valve of high pressure gas regulators, a valve seat member comprising an alloy consisting substantially of 75% copper and 25% zinc treated in a bath of molten hard solder in order to increase its density, possessing tensile strength at least two and a half times greater than the tensile strength of the valve stem and head member and having dense, high tensile and sparkless properties sufficient to resist fracturing and crushing of the seat member, to prevent leaking through of surplus volume and excess pressure of the gases under use.

5. A method of making valve heads and stems for high pressure gas regulators which comprises alloying nickel, iron and copper, rolling the alloy, forging the same at 1550° F., then immediately air cooling the forging by the use of a cold air current so as to anneal the same.

6. A method of making valve seats for high pressure gas regulators which comprises alloying copper and zinc, forming therefrom a valve seat member and forming valve seats thereon by applying to said member a coating of an alloy of tin and lead.

7. A method of making valve seats for high pressure gas regulators which comprises alloying 75% copper and 25% zinc, forming from said alloy a valve seat member and forming a valve seat thereon by applying thereto hard solder.

8. A valve stem and head for high pressure gas regulators having a tensile strength of at least 85,000 pounds per square inch.

9. A valve seat for high pressure gas regulators having a tensile strength of at least 260,000 pounds per square inch.

In testimony whereof, I affix my signature.

THOMAS COLES.